United States Patent Office 3,366,596
Patented Jan. 30, 1968

3,366,596
SELF-EXTINGUISHING POLYESTERS WITH
ZINC OR LEAD SULFITES
Herbert Ronald Everard, Gatley, Cheshire, and Frank
Ernest Bassford, Langley, Oldbury, England, assignors
to British Industrial Plastics Limited, London, England,
a corporation of England
No Drawing. Filed May 10, 1965, Ser. No. 454,662
Claims priority, application Great Britain, May 13, 1964,
19,999/64
16 Claims. (Cl. 260—40)

ABSTRACT OF THE DISCLOSURE

Compositions comprising unsaturated polyester resins contain small but effective amounts of lead sulphite and/or zinc sulphite. Self-extinguishing polyester resins may or may not contain chlorine compounds and/or in the alternative, polyester resins wherein the chlorine is chemically combined therewith. The compositions are particularly useful in preparing, for example, coatings wherein the metal sulphites are used in amounts preferably ranging from 20 to 70% by weight. In addition, the compositions may be used in preparing moulds, etc., wherein glass fibers, for example, are used as a reinforcement. Here, the lead or zinc sulphites may be used in amounts ranging from 40 to 300% by weight of the resin.

---

This invention relates to moulding compositions containing polyester resins which have improved self-extinguishing characteristics and to articles made from such compositions.

It is well known to produce reinforced plastic sheets, either flat or shaped, from unsaturated polyester resins and fibrous glass reinforcement in various forms. Herein the term "unsaturated polyester" is intended to denote a solution in a copolymerisable ethylenically-unsaturated monomer, such as styrene, of a polyester derived from a glycol and a mixture of an alpha-beta ethylenically-unsaturated dicarboxylic acid, for instance maleic or fumaric acid, and a saturated dicarboxylic acid, for instance adipic or phthalic acid. Such polyesters are described, for example, in U.K. patent specifications Nos. 497,175, 540,167, 540,168, 540,169, 592,046, 644,287, 656,138 and others.

These are unsuitable for many purposes since they suffer from the disadvanatge that they are flammable. Improved properties in this respect may be obtained by incorporating therein substances of high chlorine content, such as chlorinated waxes and polyvinyl chloride. Further improvements are obtained if the unsaturated polyester has chlorine chemically combined therewith, and such modified polyesters may be made, for example, by using tetrachlorphthalic anhydride or chlorendic acid in place of the saturated acid mentioned above. For the purposes of this specification such resins, i.e. having chlorine-containing compounds incorporated therein or having chlorine chemically combined therewith, are defined as self-extinguishing resins. However, self-extinguishing resins having chlorine-containing additives suffer from the disadvantage that the presence of chlorine therein tends to lower the heat distortion point of reinforced sheets made using them, and the presence of chlorine in self-extinguishing resins in general tends to lower the weather resistance and light-stability of such sheets.

It is an object of the invention to provide a polyester resin-containing composition which, while having improved self-extinguishing characteristics, does not suffer from the above disadvantages, and thus, according to the present invention, there is provided a new composition which comprises a glass fibre reinforced unsaturated polyester resin as hereinbefore defined and lead sulphite or zinc sulphite.

Reinforced plastic articles made in the conventional manner from glass fibre mat or a randomly distributed glass fibre and a self-extinguishing polyester resin using the normal glass:resin ratio of about 30:70, when tested by the surface spread of flame test Part I of BS.476–1953, usually conform to class 4, whereas for many purposes sheets or other mouldings are required which will conform to class 2. It is a further object of the present invention to produce a glass-fibre-reinforced polyester resin article, especially a laminate, which will conform to class 2 of the above-mentioned test.

Further according to the invention, there is provided a new composition which comprises a glass fibre reinforced self-extinguishing resin as hereinbefore defined and lead sulphite or zinc sulphite.

The invention also provides an article made from a composition comprising a glass fibre reinforced unsaturated polyester resin or self-extinguishing resin and lead or zinc sulphite. The article may be made from the resin and reinforcement with a coating of resin and sulphite, or alternatively the article base may be formed from the sulphite-containing resin, the coating containing resin but no sulphite. If desired, both the article base and the coating may comprise sulphite-containing resin.

Similarly the self-extinguishing properties of a glass fibre reinforced unsaturated polyester resin or self-extinguishing resin may be improved by applying to the resin a coating comprising an unsaturated polyester resin or self-extinguishing resin and lead or zinc sulphite, and curing the coating.

The coating to be used is preferably one which passes through the state of being a gel, and is therefore hereinafter referred to as a gel coat.

The resinous composition used for the gel coat may also contain a catalyst system suitable for either hot or cold setting, as desired, and may incorporate other additives such as pigments or additives capable of imparting to the composition thixotropic properties, for example finely divided silica.

In the production of laminates, the gel coat may be laminated to the glass reinforced polyester article in various ways known in the art. For instance, in the hand lay-up process the resinous composition used in the gel coat is brushed or sprayed on to a mould surface to give a uniform smooth coating, and is then gelled and partially cured, either at ambient temperature or by applying heat. The glass reinforcement and the resin used for forming the body of the article are then applied in known manner. Since in this process parts of the mould may be vertical or nearly vertical it is normally preferred to add a thixotropic agent to the resin to prevent drainage. When producing flat sheeting or longitudinal corrugated sheeting continuously the gel coat may be applied by the method described in U.K. patent specification No. 899,307; another process, which is particularly applicable to flat sheeting on which a gel coat with a glossy surface is desired, is described in our co-pending British application No. 4269/64.

The resinous composition used in the process of the invention should have the properties commercially desirable in any gel coat. It is thus preferable that it should be resilient. For this purpose the resin used is preferably a mixture of two self-extinguishing resins of which one is flexible.

We have found that compositions containing between 20 and 70% of sulphite, based on the weight of the resin in the composition, are very suitable. Compositions containing an unsaturated polyester resin and about 60% sulphite, based on the weight of the polyester resin, have been found to have similar self-extinguishing properties to those possessed by the self-extinguishing resins themselves.

Of course, if the resin is itself self-extinguishing, less sulphite than about 60% is needed to improve the self-extinguishing properties, and quite small amounts of sulphite display significant improvements.

When the invention is being practised by applying a gel coat to a glass fibre reinforced resinous base, which may or may not contain a self-extinguishing resin, and also may or may not contain lead or zinc sulphite, the lead or zinc sulphite in the gel coat should be in a finely divided form so that it does not settle out, and the viscosity of the mixture should be such as to be suitable for the sulphite. The amount of metal sulphite in the gel coat composition may be between 20 and 70% based on the weight of resin, and would normally be between 25 and 60% by weight where the resin is itself self-extinguishing, for which it is preferably about 30%. This quantity in finely divided form may be, and in the case of zinc sulphite generally is, sufficient to increase the apparent viscosity of the mixture by quite an appreciable extent, and it is often desirable, therefore, to add a liquid in order to reduce it to about the same value as that before addition of the sulphite. This may be done by addition of styrene or another copolymerizable monomer, but this is not desirable since it leads to a considerable deterioration in the resistance to surface spread of flame. Preferably the viscosity is reduced to about its original value by using a stable organic liquid which is not susceptible to fire, e.g. an organic sulphite, such as ethylene sulphite, a non-flammable solvent, such as tritolyl phosphate, or a phosphorous containing compound such as diallyl benzene phosphonate which may act as a reactive monomer. Although such compounds are not very effective in themselves in reducing the surface spread of flame, they do not increase it. It is also possible to reduce the viscosity of the coating composition by adding a volatile solvent thereto. For instance, acetone may conveniently be used to thin the coating composition to a consistency which allows for ready application, e.g. by spraying, and the acetone will readily evaporate from the gel coat.

A preferred coating composition according to this invention comprises about 30 parts by weight zinc sulphite, 5 parts by weight ethylene sulphite, 100 parts by weight resin, and 1½ parts by weight Aerosil (a finely divided form of silica) to give thixotropic properties. If the Aerosil is omitted because thixotropic properties are not required the same viscosity may be obtained by using rather less ethylene sulphite.

Dough moulding compositions may also be rendered self-extinguishing by means of the present invention. A typical dough moulding composition is one which contains, by weight, 20–25% glass fibre reinforcement, 55–50% finely divided mineral filler, e.g. powdered calcium carbonate, and 25% unsaturated polyester resin (i.e. polyester plus copolymerisable monomer). We have found that if part or all of the mineral filler is replaced by lead or zinc sulphite, the resulting composition has very good self-extinguishing properties, and it should be noted that this is in the absence of any chlorine containing compounds.

The lead or zinc sulphite should normally be present in such a composition in an amount of at least 40% based on the weight of the unsaturated polyester resin, and if the sulphite is present in an amount of between 200 and 300% on the same basis, the composition is found to have good arc-quenching, as well as self-extinguishing, properties. A typical modified dough moulding composition obtained in accordance with the invention and having good arc-quenching properties contains 20 to 25% by weight unsaturated polyester resin, 20 to 25% glass fibre reinforcement, and 60 to 55% lead sulphite or zinc sulphite. A typical dough moulding composition having self-extinguishing properties only contains 20 to 25% by weight unsaturated polyester resin, 20 to 25% glass fibre reinforcement, 50 to 45% calcium carbonate, and 10% lead or zinc sulphite.

Of course, the resinous component of the dough moulding composition may itself be a self-extinguishing resin. Other dough moulding compositions which may be modified according to the present invention include those described in British patent specification No. 936,351.

Modified dough moulding compositions as obtained in accordance with this invention are very suitable for making electric insulators, particularly those which are to be used adjacent power arcs, because of their good arc-quenching properties.

As to the sulphites to be used, zinc sulphite is preferred for gel coats, since its effect on the translucence of the resin composition is small. Lead sulphite is much more opaque, and is preferred for dough moulding compositions in view of its stability over the normal range of moulding temperatures. When zinc sulphite is present in the composition, mouldings obtained therefrom tend to blister if moulded at temperatures higher than 280° F. Gel coats are usually applied cold, but may be cured at elevated temperatures, although such would not normally exceed 200° F.

The invention is illustrated by means of the following examples. The preparation of three polyester resin compositions having self-extinguishing properties is described first. Where reference is made in the examples to "parts," parts by weight is meant.

Resin A

A self-extinguishing resin was produced by condensing 1.05 mol diethylene glycol, 7.35 mol ethylene glycol, 4.75 mol chlorendic acid and 3.25 fumaric acid to an acid number of 35, and dissolving the resin in styrene in the proportion resin:styrene of 74:26, together with 0.010% hydroquinone as inhibitor.

Resin B

A more flexible self-extinguishing resin was produced by condensing 1.0 mol diethylene glycol, 11.4 mol ethylene glycol, 6.0 mol chlorendic acid, 3.65 mol fumaric acid and 2.7 mol adipic acid to an acid number of 35, and dissolving the resin in styrene in the proportion resin:styrene of 74:26, together with 0.006% hydroquinone as inhibitor.

Resin C

A polyester resin was produced by condensing 2 mol phthalic anhydride, 1 mol maleic anhydride and 3.3 mol polypropylene glycol to an acid value of 25 and dissolving the resin in styrene in the proportion resin:styrene of 62:38, with the addition of 0.0064% hydroquinone as inhibitor. To 100 parts of this resin solution were added slowly 15 parts "Cerechlor 70" (a chlorinated wax sold by I.C.I. Ltd.), 8.3 parts antimony oxide paste containing 60% antimony oxide dispersed in dimethyl phthalate, 0.75 part Ceroxin Spez, (an organic thixotropic additive made by Dehydag Deutsche Hydriewerke GmbH) and 0.3 part Novadel NL53 (cobalt siccatol containing 10% cobalt), stirring until dispersed. The mixture was then passed through a triple roll mill to ensure uniform dispersion.

EXAMPLE 1

*Preparation of resin composition for gel coat.*—The quantities of zinc sulphite indicated in Table I were slowly added to 100 parts of resin A, whilst stirring slowly with a paddle stirrer until dispersed. The mixture was then passed through a triple roll mill to ensure uniform dispersion and thorough wetting of the zinc sulphite so as to avoid premature deposition from the resin on storage. Just before use 2% Butanox M50 (methyl ethyl ketone peroxide) catalyst and 0.1% Novadel NL53 (cobalt siccatol) accelerator were mixed in.

*Preparation of laminate.*—A uniform layer, 0.012" thick, of the resin composition described above was spread upon a 12" square glass plate and allowed to gel in about 30 minutes. A laminate with a resin:glass ratio of 2:1 was then laid up on the exposed face of the gel coat using two layers of glass mat FGE 2,000 (sold by Fibreglass Ltd.), each weighing 2 oz. per square foot, and 8 oz. of resin A containing the same catalyst and accelerator proportions as described in the gel coat. The resulting laminate was rolled with a split washer roller to ensure thorough impregnation and the coating was allowed to gel. The completed laminate was afterwards post-stoved for 3 hours at 80° C. to complete the cure.

*Surface spread of flame test.*—Three specimens of dimensions 9" x 4" were cut from the 12" square laminate and two of these were tested for surface spread of flame by the test described in Paint Research Station memo 107 of January 1945. The third specimen was immersed for 2 hours in boiling distilled water, dried for 24 hours at room temperature and then subjected to the same test for comparison. Similar tests were made on a laminate which was similar to that described above with the exception that the gel cast contained no zinc sulphite. The results of these tests are set out in Table I.

TABLE I

| Zinc Sulphite Additive (parts by weight) | PRS Result Dry | | | PRS Result After Immersion | | |
|---|---|---|---|---|---|---|
| | Time to ignite, secs. | Distance burned, in. | Time to Exting., mins. | Time to ignite, secs. | Distance burned, in. | Time to Exting., mins. |
| None | 4 | 3¾ | 3½ | 1 | 4 | 3¾ |
| 20 | 2 | 4 | 3 | | | |
| 25 | 1 | 3 | 3 | 1 | 3¼ | 3 |
| 30 | 1 | 2¾ | 2¼ | 1 | 2¾ | 2½ |

EXAMPLE 2

*Preparation of resin composition for gel coat.*—50 parts resin A and 50 parts resin B were mixed together with 5 parts ethylene sulphite using a paddle stirrer. 30 parts finely divided zinc sulphite and 1½ parts Aerosil were added slowly and stirred until evenly dispersed. The mixture was then passed through a triple roll mill to ensure uniform dispersion and thorough wetting of the solid materials so as to avoid premature deposition from the resin on storage. Just before use 2% Butanox M50 catalyst and 0.1% Novadel NL53 accelerator were mixed in.

*Preparation of laminate.*—The above resin composition was applied by brush to a large glass sheet, 36" square, to form a layer between .025" and .040" thick, and was allowed to gel. A laminate backing was then built up in the same way as described in Example 1 and the completed laminate was finally post-cured in the same way.

EXAMPLE 3

A gel coat composition was prepared in exactly the same way as described in Example 2. A laminate was then laid up as in Example 1 but using 2 layers of glass FGE 2,000 of 2 oz. per square foot and 2½ lbs. of resin C which had been catalysed immediately before use by the addition of 2% Novadel Butanox M50. The laminate was post-stoved as in Example 1.

EXAMPLE 4

*Weathering tests.*—Specimens having the dimensions 9" x 4" cut from panels produced by the methods of Examples 2 and 3 were exposed in the Marr Weatherometer for 1,000 hours to continuous xenon arc radiation combined with intermittent water spray. A slight yellowing of the gel coat occurred but otherwise the appearance was still satisfactory. Tests were carried out for surface spread of flame by the Paint Research Station method described in Example 1 on samples of the laminates obtained from Examples 2 and 3, and also upon such laminates after exposure for 1,000 hours. The results are summarised in Table II.

TABLE II

| | Time to ignite, secs. | Distance burned, in. | Time to Exting., mins. |
|---|---|---|---|
| Laminate of Ex. 2 (original) | 2 | 2¼–3 | 2½ |
| Laminate of Ex. 2 (after 1,000 hours) | 1 | 2¼ | 2 |
| Laminate of Ex. 3 (original) | 2 | 2½ | 2½ |
| Laminate of Ex. 3 (after 1,000 hours) | 1 | 2½ | 2 |

EXAMPLE 5

Six samples, each 36" x 9", were cut from two 36" square panels prepared as in Example 2. Six similar samples were cut from panels prepared as in Example 3. They were tested according to the surface spread of flame test of B.S. 476–1953 Part I and both complied with the requirements of class 2. Comparison tests on laminates made from the same base resins, but without the coating according to the present invention, complied with the requirements of class 4.

The invention is further illustrated in connection with unsaturated polyester resin compositions which are not in themselves self-extinguishing.

*Resin D*

A general purpose resin was produced by condensing 3.3 mol propylene glycol, 1.0 mol phthalic anhydride and 2.0 mol maleic anhydride to an acid number of 35, and dissolving this resin in styrene in the proportion resin:styrene of 2:1, together with 0.008% hydroquinone as inhibitor.

*Resin E*

A general purpose resin was produced by condensing 3.1 mol propylene glycol, 1.0 mol phthalic anhydride, 2.0 maleic anhydride and 0.05 mol pentaerythritol until a test solution of 70 parts resin in 30 parts butyl acetate had an acid number of 33. Resin E consisted of a solution of 70 parts of this resin in 30 parts styrene, with 0.008 parts hydroquinone as inhibitor.

EXAMPLE 6

*Preparation of resin composition for gel coat.*—30 parts of the finely divided compound indicated in Table III were slowly added to 100 parts of resin A whilst stirring slowly with a paddle stirrer until dispersed. The mixture was then passed through a triple roll mill to ensure uniform dispersion and thorough wetting of the compound so as to avoid premature deposition from the resin. Just before use 2% Butanox M50 catalyst and 0.2% Novadel NL53 accelerator were mixed in.

*Preparation of laminate.*—A uniform layer 0.015" thick was spread upon a 12" square glass plate and allowed to gel in 20 minutes. A laminate with a resin:glass ratio of 2:1 was then laid up on the exposed face of the gel coat using two layers of FGE3001 glass mat, each weighing 2 oz. per square foot, and 8 oz. of either resin C or resin D, as indicated in Table III, and the same accelerator proportions as used in the gel coat. The resulting laminate was rolled and post stoved and specimens were tested for surface spread of flame by the method described in Example 1.

TABLE III

| Gel coat 100 parts resin A plus 30 parts | Laminate Resin | Flame Spread, ins. |
|---|---|---|
| (i) Calcium carbonate | D | 7 |
| (ii) do | C | 5 |
| (iii) Zinc sulphite | D | 3 |
| (iv) do | C | 2½ |
| (v) Lead sulphite | C | 3 |

EXAMPLE 7

In this test a comparison was made of the effect of putting zinc sulphite in the gel coat or in the base laminate, using in each case resin D for the laminate and resin A for the gel coat. The preparation was as in Example 6 except that no post stoving was used; the specimens were tested for surface spread of flame 24 hours after manufacture. The results are shown in Table IV.

TABLE IV

| Gel coat | Laminate | Flame Spread, ins. |
|---|---|---|
| Resin A | Resin D | 8 |
| 100 resin A plus 30 zinc sulphite. | do | 4 |
| Resin A | 100 resin D plus 30 zinc sulphite. | 6½ |

This shows that the sulphite has more effect when used in the gel coat, than in the backing.

EXAMPLE 8

Four dough moulding compositions were made according to standard procedure using in each case 6.25 parts resin D, 18.75 parts resin E, 54.5 parts finely divided filler as hereinafter described, 0.5 part zinc stearate, 0.6 part benzoyl peroxide, 0.05 part phenolic inhibitor and 20 parts ¼" glass fibre HPE–VH. For composition W the filler was 54.5 parts calcium carbonate; for composition X, 44.5 parts calcium carbonate and 10 parts zinc sulphite; for composition Y, 44.5 parts calcium carbonate and 10 parts lead sulphite; and for composition Z, 54.5 parts zinc sulphite. When these compositions were moulded to provide test specimens, it was found that whilst W and Y could be moulded at any temperature within the usual range of 250–320° F., X and Y blistered if moulded at temperatures in excess of 280° F., although good mouldings could be obtained up to this temperature.

Samples 5" x ½" x ⅛" were tested for flammability by placing a bunsen flame under one end of the specimen for 30 sec. and noting the time taken after removal of the bunsen for the moulding to extinguish, taking the mean of 5 tests. The results are indicated in Table V.

TABLE V

Finely divider filler:     Time to extinguish
 W—all calcium carbonate __ Continued to burn.
 X—10 parts zinc sulphite __ 86 seconds.
 Y—10 parts lead sulphite ___ 58 seconds.
 Z—all zinc sulphite _____ Immediate extinction.

It was found that when used as insulation adjacent a power-arc, composition Z had good arc-quenching properties.

EXAMPLE 9

Laminates were prepared with a resin:glass ratio of 2:1 from resin D and the additions detailed in Table VI and two layers of glass mat FGE3001 each 2 oz. per sq. foot, as previously described, but without using a gel coat. They were tested for surface spread of flame as described in Example 1.

TABLE VI

Resin composition:     Surface spread of flame
 100 parts D+30 parts zinc sulphite _____ >8 in.
 100 parts D+60 parts zinc sulphite _____ 5 in.
 100 parts D+30 parts Hydral 710 _____ >8 in.
 100 parts D+60 parts Hydral 710 _____ 8 in Hydral 710 is a finely divided aluminium hydroxide as recommended in Canadian specification 575,331 for improving the fire resistance of polyester resins, and is here included for comparison.

What is claimed is:
1. A composition comprising an unsaturated polyester resin and at least about 20% based on the weight of the resin, of a compound selected from the group consisting of lead sulphite and zinc sulphite.
2. The composition of claim 1 wherein the unsaturated polyester resin has chlorine chemically combined therein.
3. The composition of claim 1 comprising a chlorine-containing compound.
4. The composition of claim 1 wherein the sulphites are present in amounts ranging from 20 to 70%, based on the weight of the resin.
5. The composition of claim 4 wherein the sulphites are present in amounts ranging from 25 to 60%, based on the weight of the resin.
6. A composition comprising an unsaturated polyester resin, at least about 20% based on the weight of the resin, of a compound selected from the group consisting of lead sulphite and zinc sulphite, and a liquid organic sulphite as diluent.
7. A moulding composition comprising an unsaturated polyester resin, glass fibre reinforcement, and from 40 to 300% by weight, based on the weight of the resin, of a compound selected from the group consisting of lead sulphite and zinc sulphite.
8. The composition of claim 7 wherein the unsaturated polyester resin has chlorine chemically combined therein.
9. The composition of claim 7 comprising a chlorine-containing compound.
10. The composition of claim 7 comprising a finely-divided mineral filler.
11. A moulding composition consisting essentially of 20 to 25% by weight of a resin selected from the group consisting of unsaturated polyester resins, unsaturated chlorine-containing polyester resins, and unsaturated polyester resins containing a chlorine-containing compound, 20 to 25% by weight of glass fibre reinforcement, and 60 to 55% by weight of a compound selected from the group consisting of lead sulphite and zinc sulphite.
12. A moulding composition consisting essentially of 20 to 25% by weight of a resin selected from the group consisting of unsaturated polyester resins, unsaturated chlorine-containing polyester resins, and unsaturated polyester resins containing a chlorine-containing compound, 20 to 25% by weight of glass fibre reinforcement, 10% by weight of a compound selected from the group consisting of lead sulphite and zinc sulphite, and 50 to 45% by weight of finely-divided calcium carbonate.
13. A method of producing an article from glass-fibre reinforced resinous materials which comprises applying a coating comprising a resin selected from the group consisting of unsaturated polyester resins, unsaturated chlorine-containing polyester resins, and unsaturated polyester resins containing a chlorine-containing compound, and at least about 20% based on the weight of the resin, of a compound selected from the group consisting of lead sulphite and zinc sulphite, to the surface of a mould, gelling and partially curing the coating, and applying to said coating a backing layer; said layer comprising a glass-fibre reinforced resin selected from the group consisting of unsaturated polyester resins, un- saturated chlorine-containing polyester resins, and unsaturated polyester resins containing a chlorine-containing compound.

14. A method of producing an article from glass-fibre reinforced resinous material which comprises applying a coating comprising a resin selected from the group consisting of unsaturated polyester resins, unsaturated chlorine-containing polyester resins, and unsaturated polyester resins containing a chlorine-containing compound, to the surface of a mould, gelling and partially curing the coating, and applying to the coating a backing layer; said layer comprising a glass-fibre reinforced resin selected from the foregoing group and at least about 20%, based on the weight of resin, of a compound selected from the group consisting of lead sulphite and zinc sulphite.

15. The method of claim 14 wherein the coating comprises a compound selected from the group consisting of lead sulphite and zinc sulphite.

16. A laminated article comprising a core of glass-fibre reinforced resin; said resin selected from the group consisting of an unsaturated polyester, an unsaturated chlorine-containing polyester and an unsaturated polyester containing a chlorine-containing compound, said core having a coating comprising (a) a resin selected from the group consisting of an unsaturated polyester resin, an unsaturated chlorine-containing polyester resin and an unsaturated polyester resin containing a chlorine-containing compound and (b) at least about 20%, based on the weight of the resin, of a compound selected from the group consisting of lead sulphite and zinc sulphite.

References Cited
UNITED STATES PATENTS

| | | | |
|---|---|---|---|
| 3,320,192 | 5/1967 | Ostrowicz | 260—39 |
| 2,960,486 | 11/1960 | Pye | 260—45.7 |

MORRIS LIEBMAN, *Primary Examiner.*

R. BARON, *Assistant Examiner.*